(12) United States Patent
Kita

(10) Patent No.: US 6,983,069 B2
(45) Date of Patent: Jan. 3, 2006

(54) IMAGE PROCESSING METHOD, IMAGE PROCESSING DEVICE, IMAGE PROCESSING PROGRAM, AND RECORDING MEDIUM FOR RECORDING IMAGE PROCESSING PROGRAM

(75) Inventor: Kouji Kita, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 583 days.

(21) Appl. No.: 09/915,532

(22) Filed: Jul. 27, 2001

(65) Prior Publication Data

US 2002/0051569 A1 May 2, 2002

(30) Foreign Application Priority Data

Jul. 27, 2000 (JP) .................................. 2000-227896

(51) Int. Cl.
*G06K 9/00* (2006.01)

(52) U.S. Cl. ........................................ 382/167; 382/266
(58) Field of Classification Search ................. 382/162, 382/166, 167, 254, 264, 266, 274, 275; 358/1.9, 358/3.26, 515, 518, 520, 532; 348/622–631
See application file for complete search history.

(56) References Cited

U.S. PATENT DOCUMENTS

| | | | | |
|---|---|---|---|---|
| 5,418,574 A | * | 5/1995 | Miyabata et al. | ........... 348/625 |
| 5,729,360 A | | 3/1998 | Kita et al. | |
| 6,021,216 A | * | 2/2000 | Sathe et al. | .................. 382/166 |
| 6,031,581 A | * | 2/2000 | Harrington | .................... 348/630 |
| 6,148,115 A | * | 11/2000 | Mackinnon et al. | ........ 382/266 |

FOREIGN PATENT DOCUMENTS

| | | |
|---|---|---|
| EP | 0881822 A | 12/1998 |
| JP | 58-68374 A | 4/1983 |
| JP | 60-167574 A | 8/1985 |
| JP | 63-54093 A | 3/1988 |
| JP | 4-95488 A | 3/1992 |
| JP | 7-212583 A | 8/1995 |
| JP | 7-212611 A | 8/1995 |
| WO | WO 91/03795 A | 3/1991 |

* cited by examiner

*Primary Examiner*—Amelia M. Au
*Assistant Examiner*—Ishrat Sherali
(74) *Attorney, Agent, or Firm*—Smith Patent Office

(57) ABSTRACT

The image processing device is configured including: a Y/C separator section for separating image data into chromaticity data $BY_{xy}$, $RY_{xy}$ and luminosity data $YY_{xy}$; a chromaticity noise removing section for smoothing the chromaticity data $BY_{xy}$, $RY_{xy}$: a luminosity noise removing section for smoothing the luminosity data $YY_{xy}$; and a noise-removing-rate computing section for computing a distribution parameter DP representative of a variation of the luminosity data $YY_{xy}$ in two-dimensional coordinate space and computing, for each unit area of an image, a rate of the smoothing of the chromaticity data $BY_{xy}$, $RY_{xy}$ and a rate of the smoothing of the luminosity data $YY_{xy}$ according to the distribution parameter DP as outputs to the chromaticity noise removing section and the luminosity noise removing section respectively. The image processing device can execute image processing on digital image data to reduce a coarse look caused by film particles without blurring edges in the image.

10 Claims, 12 Drawing Sheets

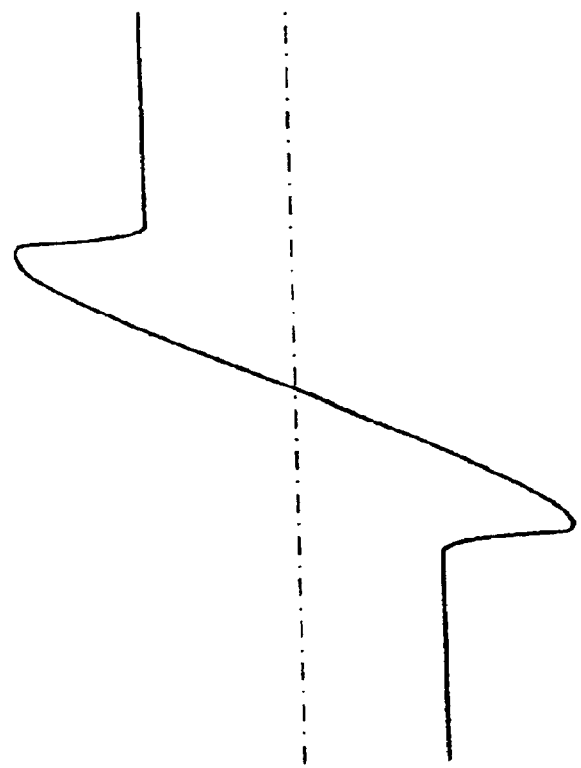
FIG. 11A BEFORE TRANSFORMATION
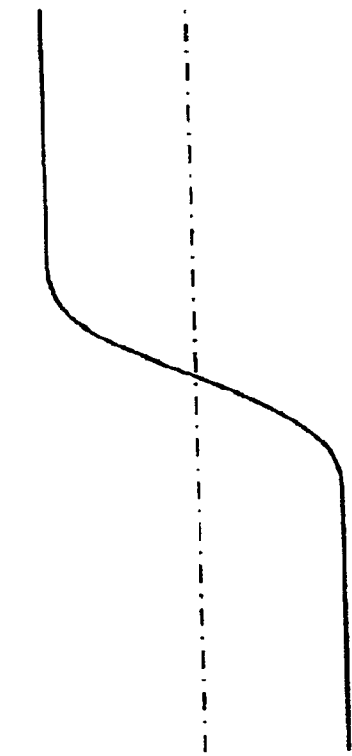
FIG. 11B AFTER TRANSFORMATION

IMAGE PROCESSING METHOD, IMAGE PROCESSING DEVICE, IMAGE PROCESSING PROGRAM, AND RECORDING MEDIUM FOR RECORDING IMAGE PROCESSING PROGRAM

FIELD OF THE INVENTION

The present invention relates to an image processing method, an image processing device to carry out the image processing method, and a recording medium to record a program implementing the image processing method, whereby the quality of an image produced on photosensitive material from digital image data is improved by reducing particle noise that cause a coarse look of the image without blurring the edges in the image.

BACKGROUND OF THE INVENTION

Conventionally, photographs have been printed by analog exposure whereby light is projected onto a photographic film recording having an original image thereon, so that the light having passed through that photographic film illuminates photographic printing paper. Another popular method in recent years is digital exposure whereby monochromatic red, green, and blue lights are projected on each pixel on photographic printing paper for printing on the basis of digital image data obtained by scanning an image on a photographic film with a scanner or the like or by taking photographs with a digital camera, etc.

In a photographic printing device for carrying out digital exposure, the pixel density of an image printed on photographic printing paper is dictated by the resolution of the scanner and that of the exposure head. Particles forming an image on a positive film have a typical density of about 2500 dpi. Digital-exposure photographic printing devices are already introduced to the market with the same level of resolution as the particle density. The digital-exposure photographic printing device is capable of acquiring an image having the same level of resolution as the particle density of a film and printing on photographic printing paper images that are not inferior to those printed by analog exposure.

Note that the particle density of 2500 dpi is equivalent to 3445×2362 pixels on a 135 F-size (3.6 cm×2.4 cm) photographic film.

The photographic printing device for carrying out digital exposure can process image data and produces on the image such various special effects that an analog-exposure photographic printing device cannot produce. One of the special effects is sharpening whereby images (for example, those of people in the background and of facial features of a person) have prominent edges. In the following description, more details will be given as to sharpening.

Sharpening is a process to form clear boundaries, i.e., edges, between adjacent objects in an image. Specifically, a set of data, termed a spatial filter, is used on image data to convert the image data in such a manner to impart large luminosity differences to target pixels constituting an edge and their adjacent pixels. A very simple example is given below.

A 3×3 spatial filter is expressed as a 3×3 array, for example, $$\begin{array}{rrr} 0 & -1 & 0 \\ -1 & 5 & -1 \\ 0 & -1 & 0 \end{array}$$

where each element represents a coefficient applied to the luminosity of one of the 3×3 pixels. Here, the middle value, 5, is the element applied to the target pixel, and the other values are those applied to the adjacent pixels of the target pixel. The 3×3 filter is basically devised so that its elements add up to 1.

For example, a 100×100 pixel image is subjected to the 3×3 filter 10000 times, with a different pixel chosen as the target pixel each time, to sharpen the whole image.

Effects of the 3×3 filter will be described by way of a concrete example. An image of a car, an airplane, or another object on a road, the sky, or another background as has many, what we call, monotonous parts where the image varies little in chromaticity and luminosity in the background. As an example, the luminosities of 3×3 pixels in a monotonous part of the image are represented by a 3×3 array, $$\begin{array}{rrr} 51 & 49 & 53 \\ 52 & 50 & 49 \\ 48 & 51 & 47 \end{array}$$

Multiplying the elements of the 3×3 filter array and the associated elements of the 3×3 pixel array, element by element, is equivalent to applying the filter to the pixels. The filtered luminosities of the pixels are represented by a 3×3 array, $$\begin{array}{rrr} 0 & -49 & 0 \\ -52 & 250 & -49 \\ 0 & -51 & 0 \end{array}$$

Since the values of the filtered luminosity add up to 49, the value, 50, of the target pixel is now set to 49. It would be understood from this example that the filtering hardly changes luminosity in the monotonous part of the image.

The luminosities of 3×3 pixels on an edge of the object are represented by a 3×3 array, for example, $$\begin{array}{rrr} 10 & 30 & 70 \\ 15 & 50 & 90 \\ 20 & 80 & 85 \end{array}$$

At this part of the edge, values are low near the upper left corner and high near the lower right corner. Applying the 3×3 filter to the 3×3 pixels, we obtain $$\begin{array}{rrr} 0 & -30 & 0 \\ -15 & 250 & -90 \\ 0 & -80 & 0 \end{array}$$

Since the values of the filtered luminosity add up to 35, the value, 50, of the target pixel is now set to 35.

Now moving to a new target pixel with a value, 90, which is to the right of the target pixel, the luminosities of the 3×3 pixels are represented by a 3×3 array, for example, $$\begin{array}{rrr} 30 & 70 & 85 \\ 50 & 90 & 95 \\ 80 & 85 & 90 \end{array}$$

Applying the 3×3 filter to the 3×3 pixels, we obtain $$\begin{matrix} 0 & -70 & 0 \\ -50 & 450 & -95 \\ 0 & -85 & 0 \end{matrix}$$

Since the values of the filtered luminosity add up to 150, the value, 90, of the target pixel is now set to 150. It would be understood from this example that the filtering changes luminosity by great amounts in the edge part of the image.

FIGS. 11(a), 11(b) illustrate the image data at the edge part before and after the filtering. The illustration tells that sharpening is a process to add a spike-like amplification in FIG. 11(b) to the original contrast in FIG. 11(a) at an edge to enhance the contrast at the edge.

To sum up the description so far, the spatial filter, when used in processing image data, hardly changes the image data in monotonous parts of the image, but increases luminosity differences at the edges. Subjecting all the pixels of the image to this process enhances the sharpness of the whole image.

This conventional sharpening method, however, has a problem; images printed on photographic printing paper will have their coarse look exacerbated too.

The aforementioned high resolution digital-exposure photographic printing device is capable of acquiring an image having practically the same level of resolution as the particle density of a film. A photograph, if printed on the same scale as the photographic film, is made of pixels, each as large as a film particle. The film particles share among them very similar, but not completely identical, coloring properties and cause fine variations in chromaticity and luminosity. The "noise" occurring in the film particle level (hereinafter, will be referred to as film particle noises) is passed on in the course of printing, causing a coarse look of the printed photograph.

The greater the proportion relative to the image acquired from a photographic film is by which a photograph is scaled up in the course of projection and printing on photographic printing paper, the more distinct the film particle noise of the resultant photograph appears.

In short, the conventional sharpening method exacerbates the particulate nature of the photographic film, as well as enhances edges in an image, imparting a more coarse look to the image printed on photographic printing paper. The resultant image may look very ugly. Image quality degrades, especially, if human skin gives a rough look.

The following will describe sharpening as a cause of the exacerbation of film particle noise by way of a concrete example. An example of 3×3 pixels is given having luminosities represented by a 3×3 array, $$\begin{matrix} 45 & 45 & 45 \\ 45 & 90 & 45 \\ 45 & 45 & 45 \end{matrix}$$

where the middle value, 90, is film particle noise.

Applying the 3×3 filter to the 3×3 pixels, we obtain $$\begin{matrix} 0 & -45 & 0 \\ -45 & 450 & -45 \\ 0 & -45 & 0 \end{matrix}$$

Since the values of the filtered luminosity add up to 270, the value, 90, of the target pixel is now set to 270. It would be understood from this example that the filtering exacerbates the noise by a fairly great amount.

To address this problem, we need a process whereby sharpening can be carried out without accompanying exacerbation of a coarse look, which could be otherwise caused by film particles. A simple method to implement this is blurring, that is, a repeated process of replacing a value of a target pixel with a mean value of its surrounding pixels until the process covers the whole image. The blurring process, however, goes too far and blurs edges which are exactly where we wanted to increase sharpness in the first place.

A possible alternative is to implement a blurring process on acquired image data before sharpening. In this case, however, the image will be stripped of its minute details.

SUMMARY OF THE INVENTION

The present invention has an objective to provide an image processing method, an image processing device to carry out the image processing method, an image processing program to implement the image processing method, and a recording medium to record the image processing program, all for use to produce an image on photosensitive material from digital image data, whereby the produced image has less of a coarse look caused by film particles and has no edges blurred.

To achieve the objective, an image processing method in accordance with the present invention is characterized in that it includes the steps of:

separating image data into luminosity data and chromaticity data; and changing a rate of smoothing of the chromaticity data and a rate of smoothing of the luminosity data according to a variation of the luminosity data in two-dimensional coordinate space.

Film particle noise contains fine chromaticity variations and fine luminosity variations, i.e., chromaticity noise and luminosity noise. In view of this, in the foregoing method, chromaticity noise removal and luminosity noise removal can be carried out at different rates to achieve optimum noise removal: for example, chromaticity noise removal is carried out at a relatively high rate where chromaticity noise is distinctly visible, and luminosity noise removal is carried out at a relatively low rate where luminosity noise is distinctly visible.

The chromaticity variations and luminosity variations are either very small or practically ignorable in monotonous parts of the image and relatively large at edges in the image; the latter variations are particularly large at edges. Therefore, luminosity data contains more edge information of the image than does chromaticity data. This is another reason why it is preferable to carry out chromaticity noise removal and luminosity noise removal at different rates.

Another reason for this is that the human eye is more sensitive to luminosity variations than to chromaticity variations.

To retain edges in the image without blurring them, neither luminosity noise removal nor chromaticity noise removal is carried out at the edges. More preferably, since more edge information is found in the luminosity data than in the chromaticity data, the rate of luminosity noise removal should be lowered gradually to 0, but more quickly than the chromaticity noise removal, as moving from monotonous parts toward edges in the image. The chromaticity noise removal does not as much attenuate edge information as the luminosity noise removal and therefore better reduces the coarse look of the image when carried out up to quite near the edges.

For these reasons, the foregoing method, whereby the rates of smoothing of the chromaticity data and of smoothing of the luminosity data are changed according to a variation of the luminosity data in two-dimensional coordinate space, can strike the best balance between the chromaticity noise removal by means of smoothing of the chromaticity data and the luminosity noise removal by means of smoothing of the luminosity data and produce satisfactory results in both the retainment of the edges in the image and the elimination of the coarse look of the image.

To achieve the objective, an image processing device in accordance with the present invention is characterized in that it includes:

(1) a data separator section for separating image data into luminosity data and chromaticity data;

(2) a chromaticity noise removing section for smoothing the chromaticity data;

(3) a luminosity noise removing section for smoothing the luminosity data; and (4) a smoothing rate computing section for computing a variation of the luminosity data in two-dimensional coordinate space and computing, for each unit area of an image, a rate of the smoothing of the chromaticity data and a rate of the smoothing of the luminosity data according to the variation as outputs to the chromaticity noise removing section and the luminosity noise removing section respectively.

In the configuration, the smoothing rate computing section computes well-balanced rates of the smoothing of the chromaticity data and the smoothing of the luminosity data for each unit area of the image and therefore effectively reduces the coarse look of the image without blurring the edges.

The chromaticity noise removing section receives chromaticity data from the data separator section and the rate of chromaticity noise removal from the smoothing rate computing section to smooth the chromaticity data for each unit area of the image.

The luminosity noise removing section receives luminosity data from the data separator section and the rate of luminosity noise removal from the smoothing rate computing section to smooth the luminosity data for each unit area of the image.

Thus, the image has its quality greatly enhanced with better contrast, less of the coarse look, and retained sharpness of the edges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 11(a), 11(b) are explanatory figures illustrating luminosity variations at an edge in an image before and after sharpening respectively.

DETAILED DESCRIPTION OF THE PREFERRED EMBODIMENTS

The following will describe an embodiment of the present invention in reference to FIG. 1 to FIG. 12.

Typically, the human eye is more sensitive to luminosity variations than to chromaticity variations. A combination of powerful chromaticity-noise-removing blurring (smoothing) and soft luminosity-noise-removing blurring (smoothing) removes much of the noise and retains clear edges. Understanding these characteristics of the eye provided the basis for the first insight that led us successfully to the present invention.

At edges, luminosity variations are more visible than chromaticity variations. We can deduce from this fact that luminosity data contains more edge information than does chromaticity data and that the edge information is effectively retained if the blurring applied to luminosity data is restrained relatively to the blurring applied to the chromaticity data.

That said, applying powerful blurring to chromaticity data and soft blurring to luminosity data uniformly across the entire image does not enhance the sharpness of the image very much, since such blurring takes no edge information into account. This problem is addressed by extracting areas that are considered as forming edges in the image and then applying either restrained blurring or no blurring at all in those areas, while applying strong blurring to chromaticity data and soft blurring to luminosity data in the other areas; this processing retains edge information more effectively without sacrificing effectiveness in noise removal. Understanding the relationships between the blurring techniques and the retainability of edge information provided the basis for the second insight that led us successfully to the present invention.

From these insights, we have conceived an image processing method, in accordance with the present invention, whereby film particle noise in an image data output from a scanner reading a developed photographic film is reduced by separating the image data into luminosity data and chromaticity data and applying blurring to the chromaticity data and the luminosity data with thoroughness that is varied according to variations of luminosity data in two-dimensional coordinate space.

We have also conceived another image processing method, in accordance with the present invention, whereby the same goal is achieved by extracting edges from an image and removing as little noise as possible at the edges, while, at other places, giving a priority to chromaticity noise removal rather than to luminosity noise removal or removing a larger portion of the chromaticity noise than of the luminosity noise according to variations of luminosity data in two-dimensional coordinate space.

To start a specific description, the following will describe a configuration of an image processing device that implements the image processing methods in accordance with the present invention.

Figure 2:
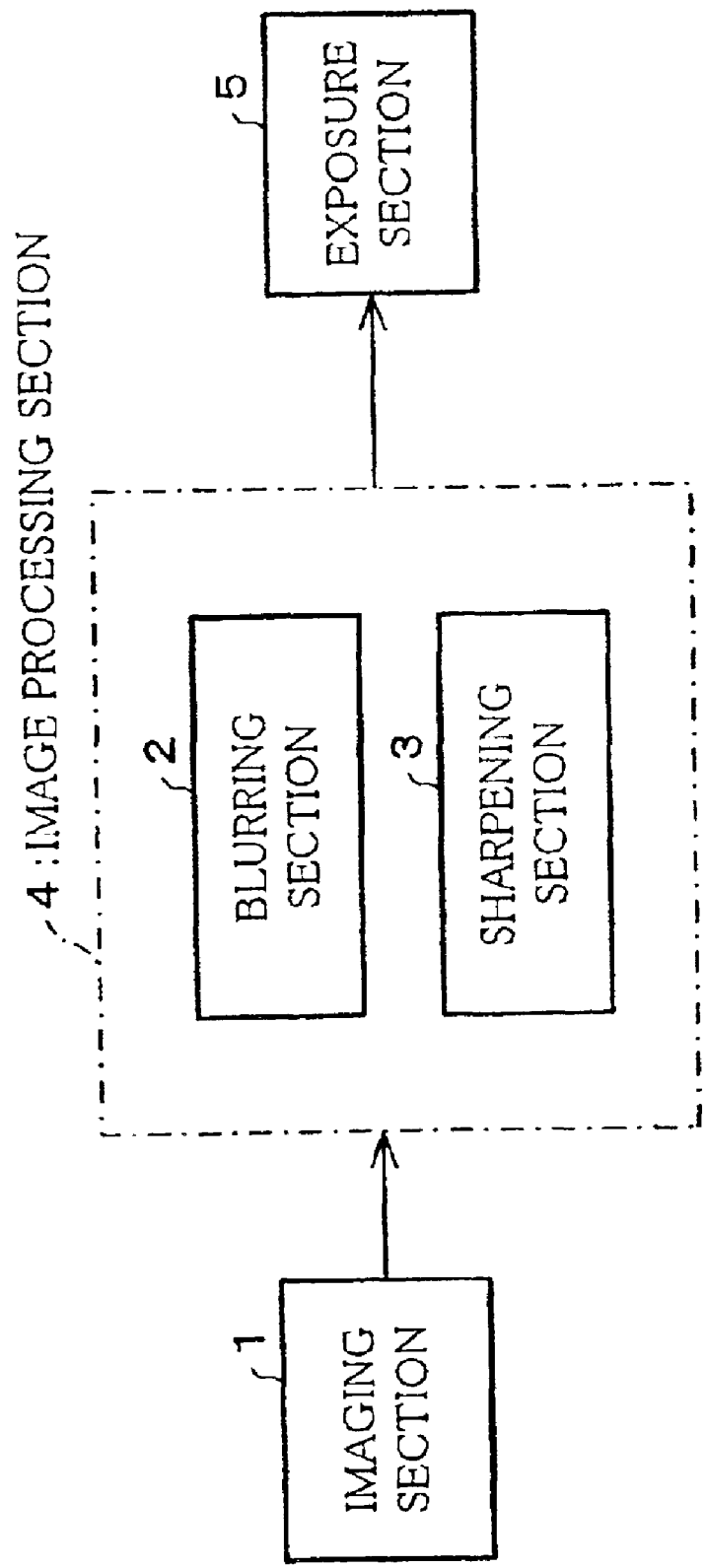
FIG. 2 is a block diagram schematically showing a configuration of a main part of the image processing device.

The image processing device is configured in accordance with the present invention so that it can print an image on photographic printing paper (photosensitive material) by illuminating the photographic printing paper according to, for example, BGR image data. As shown in FIG. 2, the image processing device has an imaging section 1, an image processing section 4 with a blurring section 2 and a sharpening section 3, and an exposure section 5.

The imaging section 1 is a scanner scanning an image (hereinafter, will be alternatively referred to as an original image in some cases) stored on a negative film by measuring light passing through the negative film, and is configured including, for example, a light source shining light onto the negative film, BGR color filters, and a CCD camera including either a single CCD (Charge-Coupled Device) or three CCDs. As light passes through the negative film and the color filters with resultant BGR components of the light entering the CCDs, the imaging section 1 transfers electric signals to the image processing section 4 according to the BGR components of the incoming light. A set of image data is thus obtained which is representative of the chromaticity and luminosity of pixels forming the original image for each of the BGR colors.

The image processing section 4 implements various kinds of image processing on the BGR sets of image data transferred from the imaging section 1, including noise removal, sharpening, compensation for irregularity in the imaging by the CCDs and in the exposure by the exposure head, gamma correction in view of the coloring properties of the photographic printing paper, etc. The image processing section 4 may be provided inside the image processing device as a microprocessor and/or DSP (digital signal processor) or outside the image processing device as a PC (personal computer). The image processing section 4 further includes a memory (not shown) temporarily storing the image data from the imaging section 1 and a control section (not shown) controlling the exposure operation of the exposure section 5.

The blurring section 2, provided in the image processing section 4, includes a structure to separate the image data into luminosity data and chromaticity data and change the thoroughness of the blurring applied to the chromaticity data and of the blurring applied to the luminosity data according to the variations of the luminosity data in two-dimensional coordinate space. More details will be given later about the image processing section 4.

The sharpening section 3, provided in the image processing section 4, is responsive to an instruction of the operator and where necessary to produce an image with sharp edges, implements sharpening on the image data from which the chromaticity and luminosity noise has been removed by the blurring section 2. Alternatively, the image data output from the imaging section 1 may be fed first to the sharpening section 3 for sharpening and then to the blurring section 2 for noise removal. No matter which process is implemented first, the resultant image has better quality than conventional images.

Yet, if blurring is implemented after sharpening, the degree of blurring must be adjusted according to that of sharpening to produce best results. In contrast, if blurring is implemented first, the degree of sharpening requires no adjustment, making the overall operation simple.

The exposure section 5 controls exposure (inclusive of no exposure) of photographic printing paper for each pixel according to the BGR sets of image data supplied from the image processing section 4 to print an image on the photographic printing paper. Examples of means to control light exposure include PLZT exposure heads, DMDs (digital micromirror devices), LCDs (liquid crystal displays), LEDs (light emitting diode) panels, lasers, FOCRTs (fiber optic cathode ray tubes), and CRTs (cathodes ray tube) Needless to say, there must be provided a separate light source to the PLZT exposure head, DMD, LCD and other control means that does not emit light by itself. A rotary BGR filter, as well as a printing and other light-focus lenses, are also disposed for each color where necessary.

PLZT is a $(Pb_{1-x}La_x)(Zr_yTi_{1-y})_{1-x/4}O_3$ solid solution which is obtained by making a solid solution (PZT) of lead zirconate ($PbZrO_3$) and lead titanate ($PbTiO_3$) of a suitable ratio and adding lanthanum before subjecting it to hot-pressing. Similarly to liquid crystal displays, PLZT can control light transmission when used in combination with a polarizer in the presence of an electric field.

The image processing device of the present embodiment has a 2167 dpi resolution and is capable of acquiring an image having practically the same level of resolution as the particle density of the film and printing an image on photographic printing paper.

Figure 1:
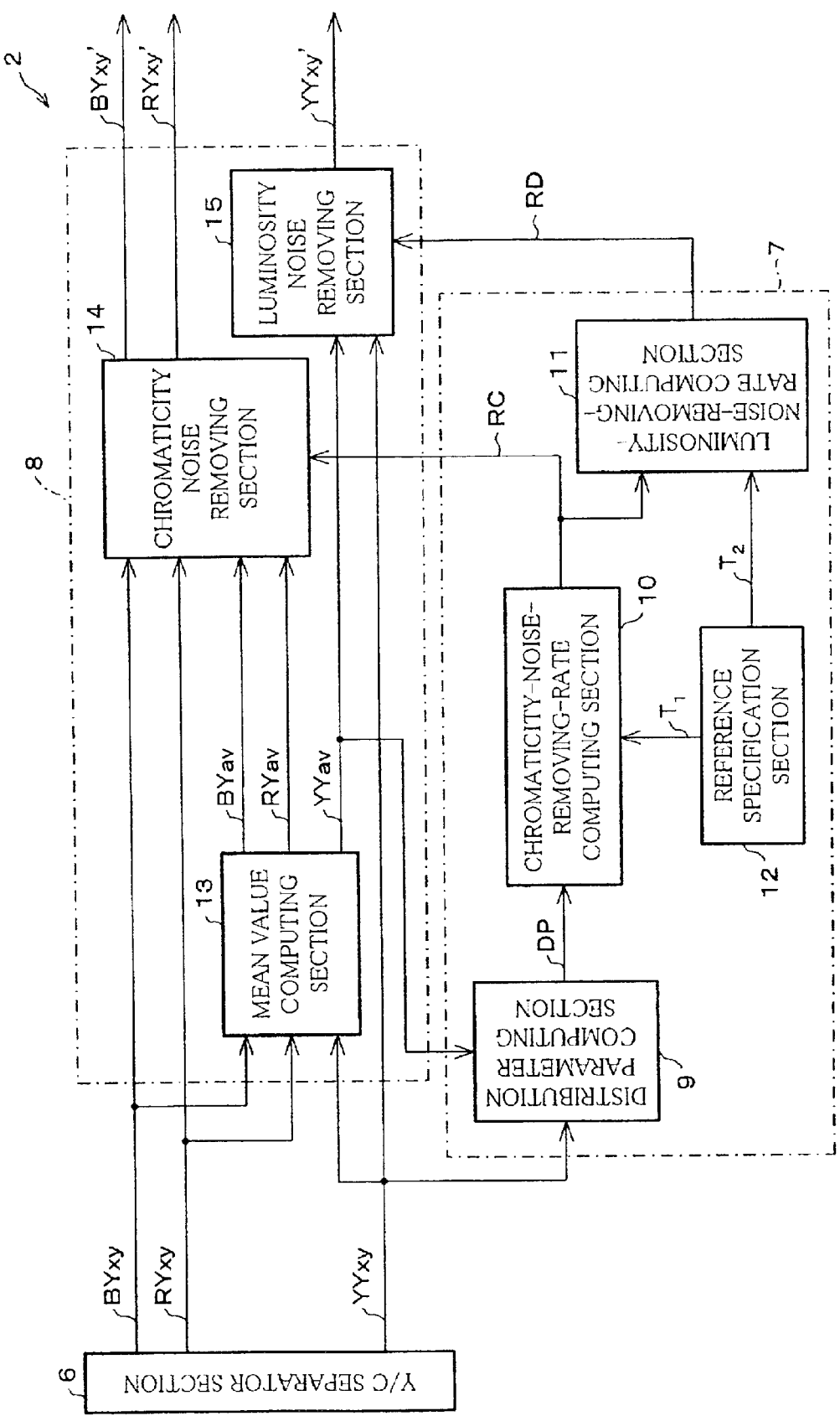
FIG. 1 is a block diagram showing a configuration of a blurring section in an image processing device in accordance with the present invention.

Now, the configuration of the blurring section 2 is described in detail. As shown in FIG. 1, the blurring section 2 is made of three major components: a Y/C separator section (data separator section) 6, a noise-removing-rate computing section (smoothing rate computing section) 7, and a noise removing section 8.

The Y/C separator section 6 is a block converting the BGR sets of image data supplied from the imaging section 1 to YCC data. The Y/C separator section 6 converts the BGR sets of image data to a combination of luminosity data and chromaticity data $BY_{xy}$, $RY_{xy}$. Characters x, y in subscript position in $YY_{xy}$, $BY_{xy}$, and $RY_{xy}$ are a two-dimensional coordinate notation for pixels in a CCD in the imaging section 1.

The noise-removing-rate computing section 7 computes variations of the luminosity data $YY_{xy}$ in two-dimensional coordinate space, or in other words, how the luminosity data $YY_{xy}$ varies between different parts of an image. Then, on the basis of the variations, it further computes rates of the blurring to be applied to the chromaticity data $BY_{xy}$, $RY_{xy}$ and of the blurring to be applied to the luminosity data $YY_{xy}$ for each unit area in the image. The rates are output to the noise removing section 8. More specifically, the noise-removing-rate computing section 7 discriminates between edges and other places in the image on the basis of the variations of the luminosity data $YY_{xy}$, so as to implement no blurring at the edges and specify the rate of the blurring for the chromaticity data $BY_{xy}$, $RY_{xy}$ greater than the rate of the blurring for the luminosity data $YY_{xy}$ at the other places.

Figure 3:
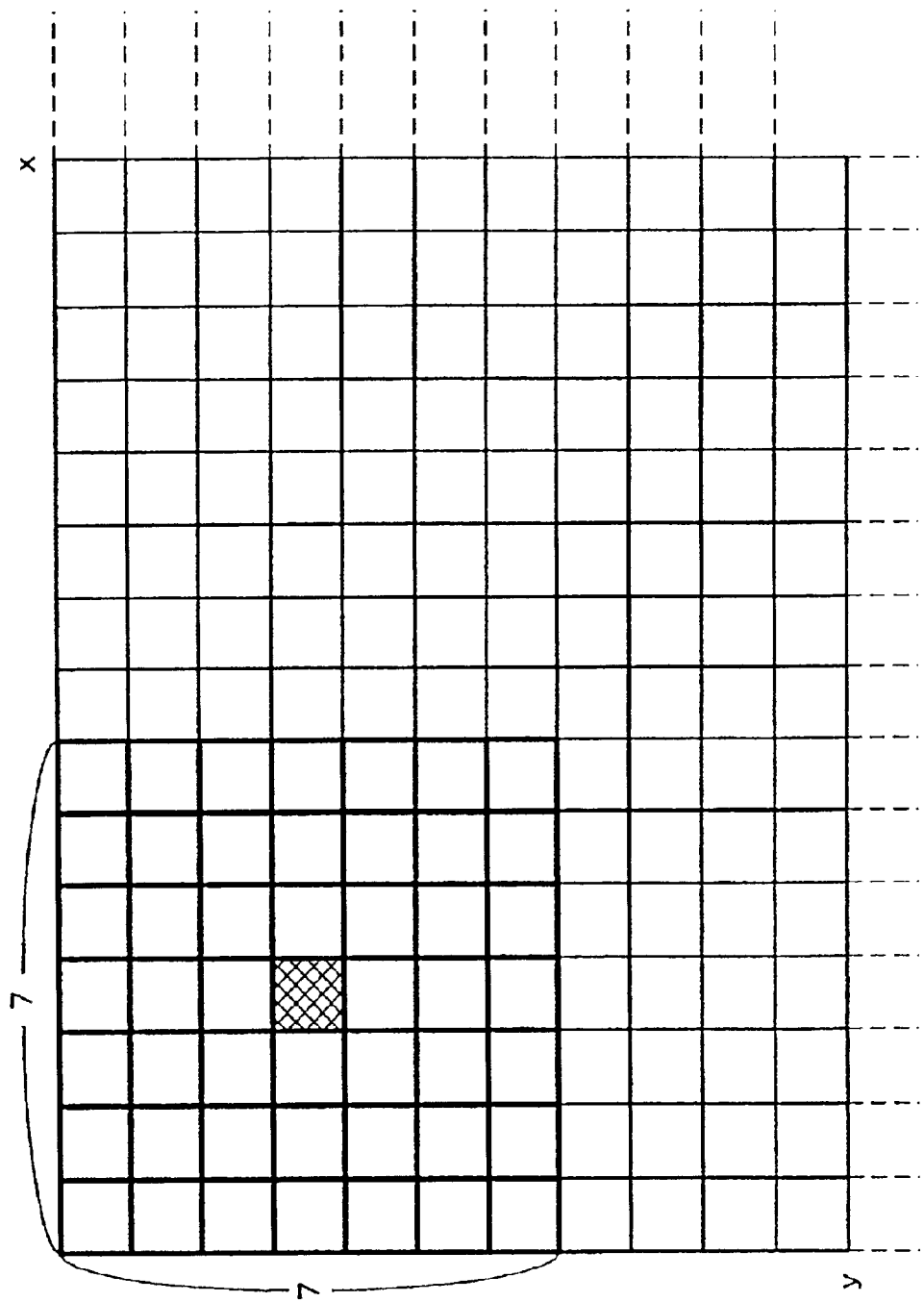
FIG. 3 is an explanatory drawing showing unit areas of an image that act as repetition units in the smoothing of chromaticity data and luminosity data.

FIG. 3 shows an example of the design of unit areas, where the image is divided into square unit areas each made up of 7×7 pixels with a target pixel in the middle. Blurring is implemented for each unit area across the entire image. The unit area is designed large enough to enclose a sufficient number of pixels to reproduce the luminosity and chromaticity of the original image for reasons laid out immediately below.

Blurring is a process of smoothing, i.e., entirely or partially replacing the chromaticity data $BY_{xy}$, $RY_{xy}$ and the luminosity data $YY_{xy}$ of a target pixel with mean values of the data over the unit area including that target pixel. When the target pixel is distinctly different from the surrounding pixels and is regarded as being noise, this process entirely or partially replaces the noise data with a mean value over the unit area, effectively reducing the noise.

Noise is located irregularly; however, if a very small unit area (hence very few pixels) includes noise in it, the resulting mean data is strongly affected by the noise. Conversely, if a very large unit area (hence very many pixels) includes noise in it, the resulting mean data is affected by two or more different noise pixels. These facts clearly show that the unit area does not work effectively to reduce noise if it is designed too small or too large.

Accordingly, we started with a very small unit area and gradually increased the number of pixels around the target pixel (hence expanded the unit area). Results were that a tendency and irregularities started appearing in the luminosity and chromaticity of the image when the unit area was expanded up to 7×7 pixels. This can be likened to the minuscule BGR dots on the screen of a CRT which appear as distinct three-color illuminated dots when viewed too close, but start forming visible luminosity and chromaticity when moving away from the CRT and viewed at a sufficient distance for the eye to see a relatively large area. It will be helpful in understanding the present invention to think that film particles are equivalent to those dots forming an image on a CRT screen.

Noise in general is abnormality in luminosity and chromaticity that either recurs (for example, stripes) or occurs in a pixel all of a sudden. The noise that we would like to reduce in the present invention is film particle noise caused by non-uniform distribution of coloring properties of the film particles.

Figure 5:
FIG. 5 is a photograph, submitted in place of a drawing, showing an output of image data subjected to neither chromaticity noise removal nor luminosity noise removal.
Figure 8:
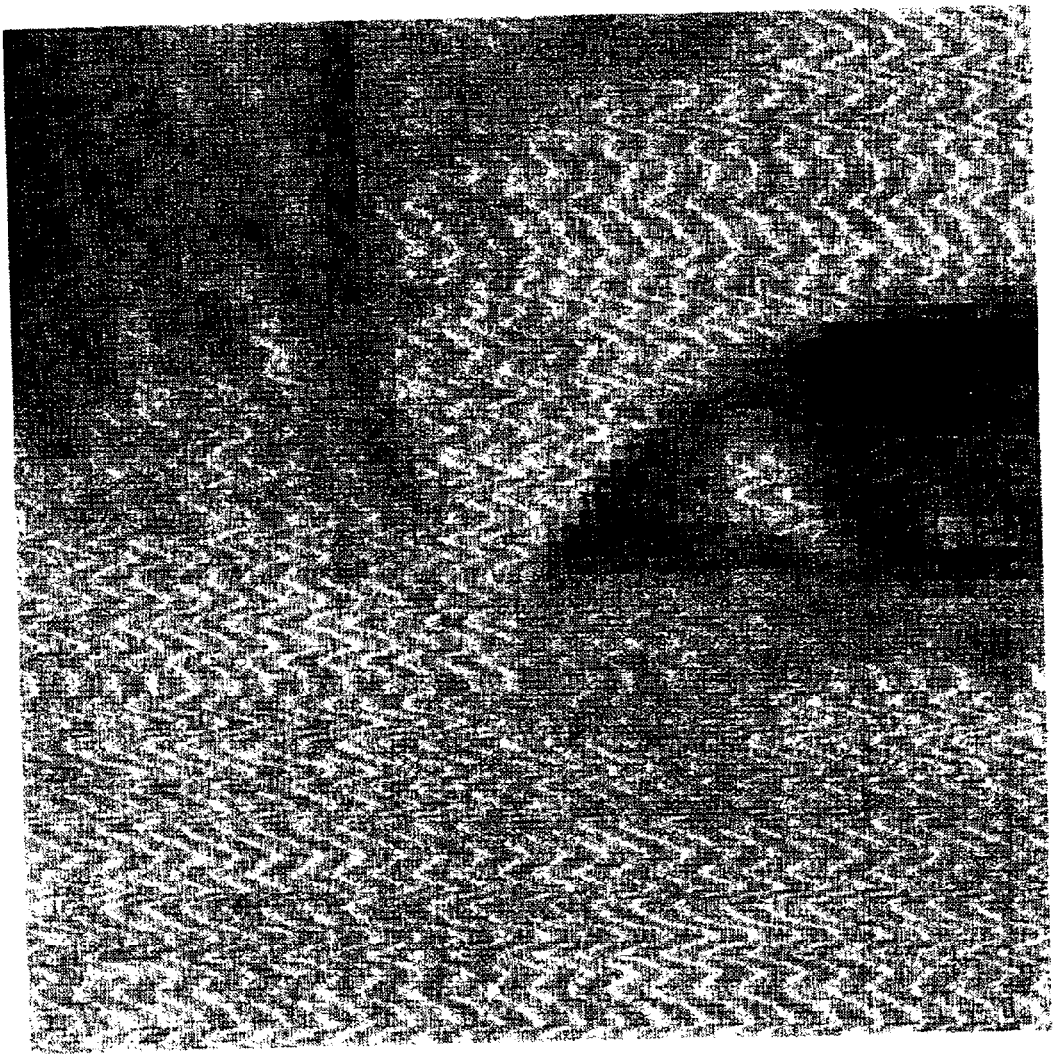
FIG. 8 is a photograph, submitted in place of a drawing, showing an output of the same image data as used for FIG. 5, but enlarged and cropped near the inner end of the left eye.

FIG. 8 shows film particle noise as an example, showing a part of the output image in FIG. 5 which is reproduced from the image data acquired by the imaging section 1 directly without subjecting it to any blurring process. To produce this image, the image data acquired by the imaging section 1 is enlarged and cropped near the inner end of the left eye. In FIG. 8, film particle noise is visible on the skin as fine, particulate variations of luminosities. Film particle noise of this form appears as a coarse look across the entire image in FIG. 5.

To determine the noise removing rates for chromaticity noise and luminosity noise, the noise-removing-rate computing section 7 includes a distribution parameter computing section 9, a chromaticity-noise-removing-rate computing section 10, a luminosity-noise-removing-rate computing section 11, and a reference specification section 12.

The distribution parameter computing section 9 computes a distribution parameter DP of the luminosity data $YY_{xy}$ fed from the Y/C separator section 6 of each unit area to obtain variations of the luminosity data $YY_{xy}$.

The chromaticity-noise-removing-rate computing section 10 computes a chromaticity-noise-removing-ratio parameter RC from the distribution parameter DP fed from the distribution parameter computing section 9. The chromaticity-noise-removing-ratio parameter RC is a parameter dictating how much of the chromaticity data $BY_{xy}$, $RY_{xy}$ of the target pixel is to be replaced with the mean values of the chromaticity data $BY_{xy}$, $RY_{xy}$ over the unit area including that target pixel.

The luminosity-noise-removing-rate computing section 11 computes a luminosity-noise-removing-ratio parameter RD from the chromaticity-noise-removing-ratio parameter RC fed from the chromaticity-noise-removing-rate computing section 10. The luminosity-noise-removing-ratio parameter RD is a parameter dictating how much of the luminosity data $YY_{xy}$ of the target pixel is to be replaced with the mean values of the luminosity data $YY_{xy}$ over the unit area including that target pixel.

The reference specification section 12 specifies a first reference value $T_1$ and a second reference value $T_2$ (will be detailed later) of the distribution parameter DP and supplies the first reference value $T_1$ to the chromaticity-noise-removing-rate computing section 10 and the second reference value $T_2$ to the luminosity-noise-removing-rate computing section 11.

The first reference value $T_1$ serves as a reference by which an area is determined where no blurring is applied at all to chromaticity noise or luminosity noise (will be detailed later). Meanwhile, the second reference value $T_2$ serves a reference by which an area is determined where chromaticity noise is removed, but luminosity noise is not removed. Both the first and second reference values $T_1$, $T_2$ are variable with an input to the reference specification section 12 if necessary.

The noise removing section 8 includes a mean value computing section 13, a chromaticity noise removing section 14, and a luminosity noise removing section 15.

The mean value computing section 13 computes mean values of chromaticity data $BY_{xy}$, $RY_{xy}$ and luminosity data $YY_{xy}$ over each unit area and outputs the results as mean chromaticity data $BY_{av}$, $RY_{av}$ and mean luminosity data $YY_{av}$.

The chromaticity noise removing section 14 receives the chromaticity data $BY_{xy}$, $RY_{xy}$ from the Y/C separator section 6, the mean chromaticity data $BY_{av}$, $RY_{av}$ from the mean value computing section 13, and the chromaticity-noise-removing-ratio parameter RC from the chromaticity-noise-removing-rate computing section 10, and replaces the chromaticity data $BY_{xy}$, $RY_{xy}$ with the mean chromaticity data $BY_{av}$, $RY_{av}$ at a rate dictated by the chromaticity-noise-removing-ratio parameter RC, so as to output replacement chromaticity data $BY_{xy}'$, $RY_{xy}'$. For some values of the chromaticity-noise-removing-ratio parameter RC, the chromaticity noise removing section 14 does not perform blurring (replacement) at all and simply passes on the chromaticity data $BY_{xy}$, $RY_{xy}$ for output.

The luminosity noise removing section 15 receives the luminosity data $YY_{xy}$ from the Y/C separator section 6, the mean luminosity data $YY_{av}$ from the mean value computing section 13, and the luminosity-noise-removing-ratio parameter RD from luminosity-noise-removing-rate computing section 11, and replaces the luminosity data $YY_{xy}$ with the mean luminosity data $YY_{av}$ at a rate dictated by the luminosity-noise-removing-ratio parameter RD, so as to output replacement luminosity data $YY_{xy}'$. For some values of the luminosity-noise-removing-ratio parameter RD, the luminosity noise removing section 15 does not perform blurring (replacement) at all and simply passes on the luminosity data $YY_{xy}$ for output.

The following will specifically describe how the film particle noise is removed by the foregoing structure. According to the present invention, the imaging section 1 creates the BGR sets of image data from a negative film and the Y/C separator section 6 separates them into the chromaticity data $BY_{xy}$, $RY_{xy}$ and the luminosity data $YY_{xy}$. Then, the noise removing section 8 removes film particle noise from the data $BY_{xy}$, $RY_{xy}$, and $YY_{xy}$. In other words, film particle noise is contained in each of the BGR sets of image data which is separated into the chromaticity noise and the luminosity noise; the film particle noise is removed from both the chromaticity noise and the luminosity noise.

To retain edges in the image, edges are first identified on the basis of variations of the luminosity data $YY_{xy}$. Blurring should not applied at all to the edges and should be increasingly strong upon moving away from the edges, i.e., moving close to the monotonous parts of the image where luminosity and chromaticity vary by only small amounts. In addition, in those areas where blurring is implemented, the chromaticity noise should be relatively thoroughly removed, while the luminosity noise should be relatively partially removed. The noise-removing-rate computing section 7 computes such a chromaticity-noise-removing-ratio parameter RC and a luminosity-noise-removing-ratio parameter RD that can establish an algorithm implementing the blurring.

The variations of the luminosity data $YY_{xy}$ are represented by the distribution parameter DP for each unit area enclosing 7×7 pixels as in FIG. 3. The distribution parameter DP is given by $$D1 = \sum_{i=x-3}^{x+3} \sum_{i=y-3}^{y+3} YY_{ij} \quad \text{[Eq. A]}$$

$$D2 = \sum_{i=x-3}^{x+3} \sum_{i=y-3}^{y+3} YY_{ij} \times YY_{ij}$$

$$DP = \{D2 - (D1 \times D1)/49\}/49 \quad \text{[Eq. B]}$$

and the computation is done by the distribution parameter computing section 9.

These two equations are devised for a practical purpose of quick computation and give only an approximate value of the distribution parameter DP. Theoretically, strictly in line with the definition of distribution, the equations are written:

$$X_{av} = \Sigma Xi/N \quad \text{[Eq. 1]}$$

$$DP = \Sigma (Xi - X_{av})^2/N \quad \text{[Eq. 2]}$$

where N is the number of pixels in a unit area.

The distribution parameter DP increases greatly when there are large luminosity variations among the 49 pixels in the unit area, because the computation involves raising to the second power in Equation 2. Chromaticity variations and luminosity variations are either very small or practically ignorable in monotonous parts of the image and relatively large at edges in the image; the latter variations are particularly large at edges. Therefore, if a unit area has a large distribution parameter DP computed as a representation of variations of the luminosity data $YY_{xy}$, the unit area can be regarded as being located at, or closely to, an edge in the image.

Accordingly, to achieve an objective of the present invention that no blurring be implemented at edges in an image, a threshold value should be specified for the distribution parameter DP so that blurring is prohibited in those unit areas where the distribution parameter DP is greater than, or equal to, the threshold value. The threshold value is specified by the reference specification section 12 as the first reference value $T_1$.

To achieve another objective of the present invention that blurring become increasingly strong as moving away from the edges, the chromaticity data $BY_{xy}$, $RY_{xy}$ and the luminosity data $YY_{xy}$ of the target pixel located in the middle of the unit area should be replaced with the respective mean values of the 49 pixels in the unit area at rates that increase as moving away from the edges.

To achieve another objective of the present invention that in those areas where blurring is implemented, the chromaticity noise should be relatively thoroughly removed, while the luminosity noise should be relatively partially removed. The rates at which the chromaticity data $BY_{xy}$, $RY_{xy}$ is replaced with associated mean values should be specified greater than the rate at which the luminosity data $YY_{xy}$ is replaced with an associated mean value.

In the present invention, the reference specification section 12 specifies the second reference value $T_2$ so that it is smaller than the first reference value $T_1$, wherein the chromaticity noise is removed at a relatively large rate and the luminosity noise is removed at a relatively small rate in those unit areas where the distribution parameter DP is smaller than the second reference value $T_2$, and the chromaticity noise is removed, but the luminosity noise is not removed, in those unit areas where the distribution parameter DP is greater than the second reference value $T_2$.

Figure 4:
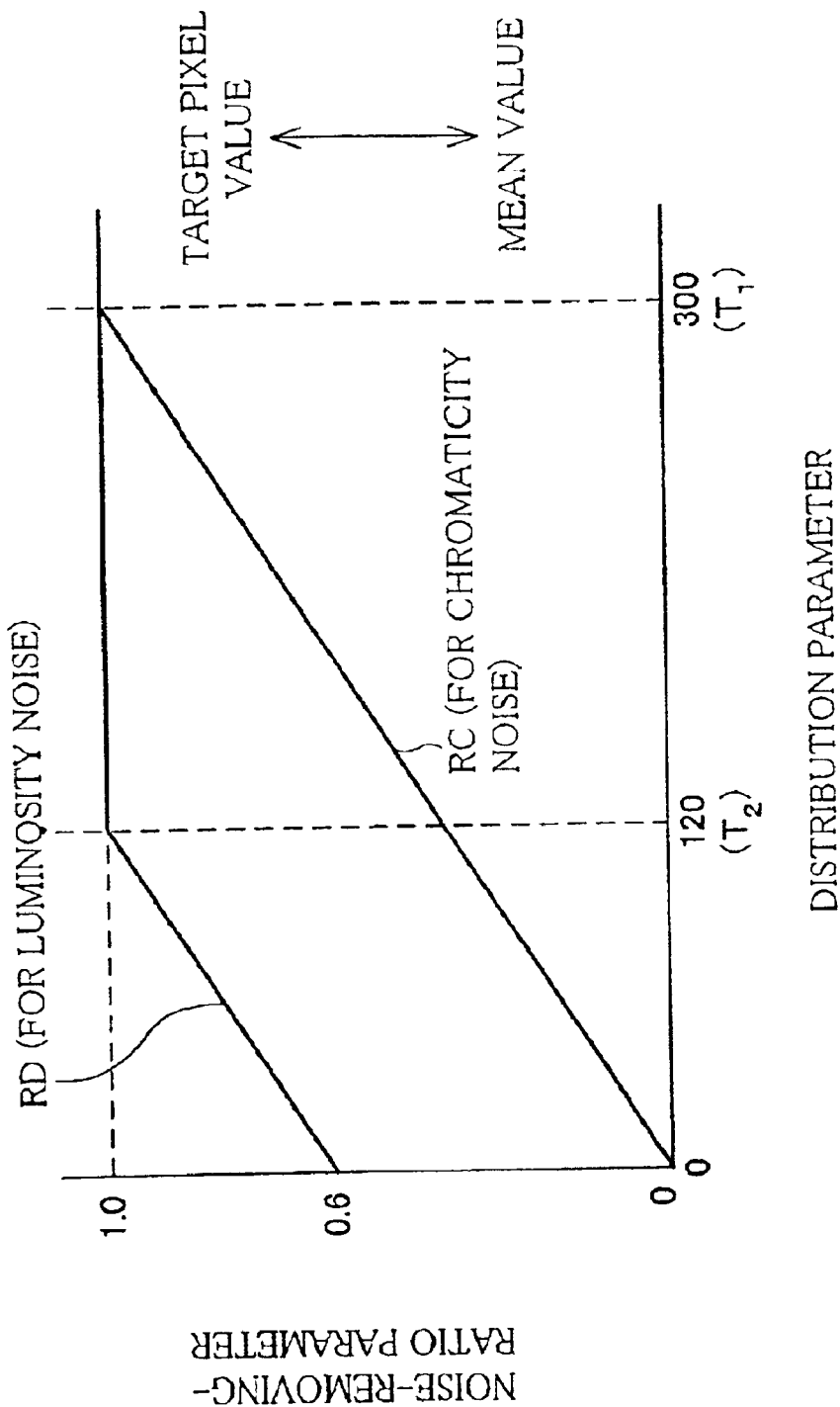
FIG. 4 is a graphical representation of an example algorithm to implement the smoothing of chromaticity data and luminosity data.

FIG. 4 shows a graphical representation of the algorithm as an example. The first reference value $T_1$ is set to 300. The second reference value $T_2$ is set to 120. The chromaticity-noise-removing-ratio parameter RC is given by $$RC = DP/300 \text{ (if } RC > 1, RC = 1) \quad \text{[Eq. 3]}$$

The luminosity-noise-removing-ratio parameter RD is given by $$RD = RC + 0.6 \text{ (if } RD > 1, RD = 1) \quad \text{[Eq. 4]}$$

The chromaticity-noise-removing-ratio parameter RC is such a variable that determines the replacement ratio on the basis of a linear ratio: specifically, when the chromaticity-noise-removing-ratio parameter RC equals 0, the chromaticity data $BY_{xy}$, $RY_{xy}$ is replaced with the associated mean values at a rate of 1, that is, replaced completely, and when it equals 1, the chromaticity data $B_{xy}$, $RY_{xy}$ is replaced with the mean value at a rate of 0, that is, retained completely.

The luminosity-noise-removing-ratio parameter RD is defined similarly so that luminosity noise removal is implemented on the basis of the same linear ratio as the chromaticity noise removal for the distribution parameter DP ranging from 0 to the second reference value $T_2$ (120): the luminosity-noise-removing-ratio parameter RD is set to 0.6 when the distribution parameter DP equals 0. The definition is based on experimental results that images printed on photographic printing paper had a desirable feel when the luminosity data $YY_{xy}$ was replaced with the mean value in those unit areas where the distribution parameter DP is from 0 120 in such a way that the replacement ratio does not exceed 0.4 (=1−0.6).

In the algorithm, the parameters RC, RD are computed by the chromaticity-noise-removing-rate computing section 10 and the luminosity-noise-removing-rate computing section 11 respectively. The chromaticity noise removing section 14 receives the chromaticity data $BY_{xy}$, $RY_{xy}$ from the Y/C separator section 6, the mean chromaticity data $BY_{av}$, $RY_{av}$ from the mean value computing section 13, and the chromaticity-noise-removing-ratio parameter RC from the chromaticity-noise-removing-rate computing section 10, and computes replacement chromaticity data $BY_{xy}'$, $RY_{xy}'$ according to the equation:

$$BY_{xy}'=BY_{av}\times(1-RC)+BY_{xy}\times RC$$

$$RY_{xy}'=RY_{av}\times(1-RC)+RY_{xy}\times RC$$

Chromaticity noise is removed from the replacement chromaticity data $BY_{xy}'$, $RY_{xy}'$.

The luminosity noise removing section 15 receives the luminosity data $YY_{xy}$ from the Y/C separator section 6, the mean luminosity data $YY_{av}$ from the mean value computing section 13, and the luminosity-noise-removing-ratio parameter RD from the luminosity-noise-removing-rate computing section 11, and computes replacement luminosity data $YY_{xy}'$ according to the equation:

$$YY_{xy}'=YY_{av}\times(1-RD)+YY_{xy}\times RD \quad [\text{Eq. 5}]$$

Luminosity noise is removed from the replacement luminosity data $YY_{xy}'$.

The mean chromaticity data $BY_{av}$, $RY_{av}$ and the mean luminosity data $YY_{av}$ are calculated by the mean value computing section 13 according to the equations:

$$BY_{av} = \sum_{i=x-3}^{x+3}\sum_{i=y-3}^{y+3} BY_{ij}/49 \quad [\text{Eq. C}]$$

$$RY_{av} = \sum_{i=x-3}^{x-3}\sum_{i=y-3}^{y+3} RY_{ij}/49$$

$$YY_{av} = \sum_{i=x-3}^{x+3}\sum_{i=y-3}^{y+3} YY_{ij}/49$$

Now, the operation of the blurring section 2 based on equations 1–5 will be described in detail. Let us take the luminosity data example involving 3×3 pixels introduced in the Background of the Invention section above for convenience.

Suppose that the Y/C separator section 6 produces the following luminosity data $YY_{xy}$ from the BGR image data fed from the imaging section 1:

51 49 53
52 50 49
48 51 47 in a 3×3-pixel unit area in a monotonous part of an image;

10 30 70
15 50 90
20 80 85 in a 3×3-pixel unit area at an edge in the image; and 45 49 45
49 74 49
45 49 45 in a 3×3-pixel unit area in a monotonous part, of the image, which contains film particle noise.

The mean value computing section 13 computes mean luminosity data $YY_{av}$ according to equation 1 for each unit area. Results are $YY_{av}(A)=50$, $YY_{av}(B)=50$, and $YY_{av}(C)=50$, for the monotonous part A, the edge B, and the monotonous part C with noise respectively.

Next, the distribution parameter computing section 9 computes a distribution parameter DP from the mean luminosity data $YY_{av}$ fed from the mean value computing section 13 and the luminosity data $YY_{xy}$ fed from the Y/C separator section 6 according to equation 2 for each unit area. Results are DP(A)=3.3, DP(B)=916.7, and DP(C)=75.6. Note that as mentioned in the foregoing, in actual practice, the distribution parameter computing section 9 computes distribution parameters DP according to equation A for quick computation.

Then, the chromaticity-noise-removing-rate computing section 10 computes a chromaticity-noise-removing-ratio parameter RC from the distribution parameter DP fed from the distribution parameter computing section 9 according to equation 3 for each unit area. Results are RC(A)=0.01, RC(B)=1, and RC(C)=0.25.

The luminosity-noise-removing-rate computing section 11 computes a luminosity-noise-removing-ratio parameter RD from the chromaticity-noise-removing-ratio parameter RC fed from the chromaticity-noise-removing-rate computing section 10 according to equation 4 for each unit area. Results are RD(A)=0.61, RD(B)=1, and RD(C)=0.85.

Finally, the luminosity noise removing section 15 computes replacement luminosity data $YY_{xy}'$ for the target pixel from the luminosity data $YY_{xy}$ fed from the Y/C separator section 6, the mean luminosity data $YY_{av}$ fed from the mean value computing section 13, and the luminosity-noise-removing-ratio parameter RD fed from the luminosity-noise-removing-rate computing section 11 according to equation 5 for each unit area, so as to replace the luminosity data $YY_{xy}$ of the target pixel with the replacement luminosity data $YY_{xy}'$. All the pixels are subjected to this process until all the luminosity data $YY_{xy}$ is replaced with replacement luminosity data $YY_{xy}'$ (Step 9 in FIG. 12).

The target pixel in the foregoing monotonous part of the image has luminosity data $YY_{xy}=50$ and computed replacement luminosity data $YY_{xy}=50$, which happen to be identical. The original luminosity data does not change in the process, and the resulting luminosity data is 51 49 53
52 50 49
48 51 47

Monotonous parts inherently do not require much effective blurring.

Further, at the edges of an image, since the luminosity-noise-removing-ratio parameter RD equals 1, the replacement ratio for the mean luminosity data $YY_{xy}$ is 0, completely retaining the original luminosity data $YY_{xy}$. Consequently, in the blurring process of the present invention, the non-edge parts of the image are blurred, i.e., the noise is removed, but the edges are not affected and the image retains its contrast.

Likewise, in monotonous parts with noise, the target pixel has luminosity data $YY_{xy}=74$ and replacement luminosity data $YY_{xy}'=70$ computed according to equation 5. The resulting luminosity data is 45 49 45
    49 70 49
    45 49 45

The distribution parameter DP(C) computed is 55.8, which shows that the luminosity data $YY_{xy}$ is now more uniform than before the transformation and that the noise peak has been attenuated. Noise has been successfully reduced. In the actual processing, the target pixel with luminosity data $YY_{xy}=74$ is not the only pixel affected, but the adjacent pixels are also subjected to the same procedures, one by one, to replace luminosity data $YY_{xy}$ with replacement luminosity data $YY_{xy}'$. The actual distribution parameter DP(C) is therefore far smaller.

More noise is removed in the above example, if the second reference value $T_2$ is set to a value larger than 120. For example, setting the second reference value $T_2$ to 180, equation 4 is written $$RD=RC+0.4$$

and RD(C)=0.65. Using this RD, replacement luminosity data $YY_{xy}'$ is obtained:

45 49 45
    49 66 49
    45 49 45

The distribution parameter DP (C) computed from the data equals 39.2, which shows that film particle noise is now less visible.

FIG. 5 to FIG. 10 show results of the foregoing image processing in accordance with present invention applied to the image data read by the imaging section 1.

FIG. 5 shows, as mentioned earlier, an output of the image data that is read by the imaging section 1 and passed on to the exposure section 5 with no noise removing process implemented at all. The output is no different from the original image.

Figure 6:
FIG. 6 is a photograph, submitted in place of a drawing, showing an output of the same image data as used for FIG. 5, but subjected to chromaticity noise removal.

FIG. 6 shows an output of the image data that is read by the imaging section 1 and subjected to chromaticity noise removal before being fed to the exposure section 5.

Figure 7:
FIG. 7 is a photograph, submitted in place of a drawing, showing an output of the same image data as used for FIG. 5, but subjected to both chromaticity noise removal and luminosity noise removal.

FIG. 7 shows an output of the image data that is read by the imaging section 1 and subjected to both chromaticity noise removal and luminosity noise removal before being fed to the exposure section 5.

A comparison of FIGS. 5–7 shows that the facial skin and the fabric of clothes appear coarse in FIG. 5 (original image), but less so in FIG. 6 and even less so in FIG. 7. Meanwhile, edge sharpness of the eyes, nose, body, etc. does not distinctly differ among FIGS. 5–7.

Figure 9:
FIG. 9 is a photograph, submitted in place of a drawing, showing an output of the same image data as used for FIG. 6, but enlarged and cropped near the inner end of the left eye.
Figure 10:
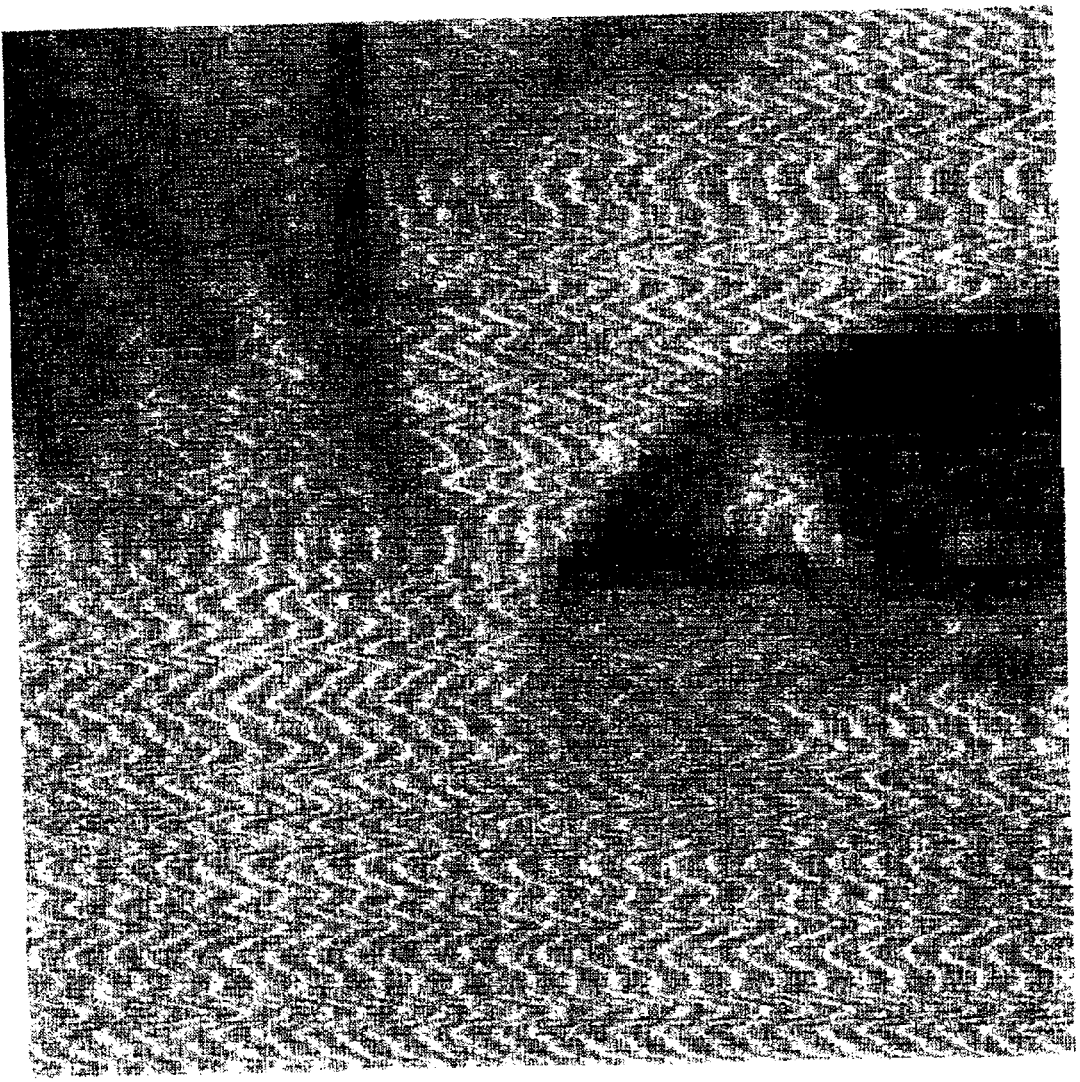
FIG. 10 is a photograph, submitted in place of a drawing, showing an output of the same image data as used for FIG. 7, but enlarged and cropped near the inner end of the left eye.

For better comparison on the film particle level, FIGS. 8–10 show output results of the same image data as used for FIGS. 5–7, but enlarged and cropped near the inner end of the left eye, for better comparison at film particle levels. The output results confirm that the film particle noise, a cause for the coarse look in the image, is gradually removed from FIG. 8 to FIG. 9 and to FIG. 10 and that edges appear little affected by the processing and are almost perfectly retained in FIGS. 6 and 7.

The foregoing noise removal, capable of retaining edges in the image, is implemented by a program stored on a recording medium that is readable by a computer. In the present invention, the recording medium (not shown) may be a memory, for example, a ROM, required for the image processing section 4 in FIG. 2 to execute the process or a program medium that is readable when inserted in an external reader device.

In either case, the recorded program may be adapted so that it is accessible and executable by a microprocessor (not shown) or that it is preinstalled in the main device and ready for readout and loading into a program memory area (not shown) in the image processing section 4 where it is executed.

The program medium may be adapted to be separable from the main device. It may be a nonvolatile medium: namely, a tape, such as a magnetic tape or a cassette tape; a magnetic disk, such as a floppy disk or a hard disk; an optical disk, such as a CD-ROM, an MO disk, an MD, or a DVD; a card, such as a memory or IC card or an optical card; or a semiconductor memory, such as a mask ROM, an EPROM, an EEPROM, or a flash ROM.

The system of the present invention is configured to connect to the Internet and other communications networks; the program medium may therefore be a volatile transmission medium to which the program is downloaded over a communications network when necessary. In this case, the program to be downloaded may be preinstalled in the main device or installed from a different recording medium when necessary.

The content of the recording medium is not limited to a program and may include data.

As described so far, an image processing method in accordance with the present invention includes the steps of:
separating image data into luminosity data and chromaticity data (Step 1 in FIG. 12); and
changing a rate of smoothing of the chromaticity data and a rate of smoothing of the luminosity data according to a variation of the luminosity data in two-dimensional coordinate space.

Figure 12:
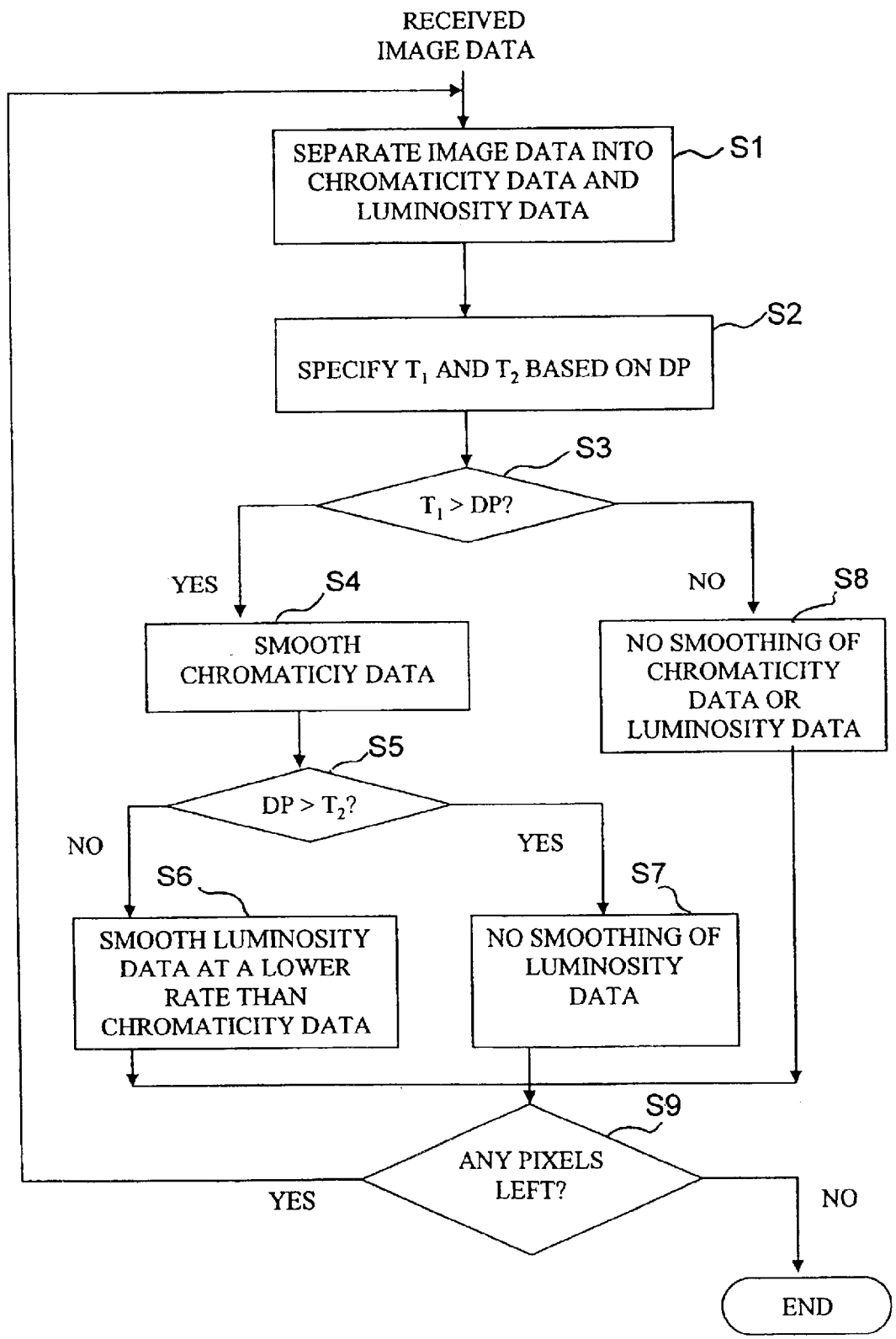
FIG. 12 is a flowchart showing an image processing method in accordance with the present invention.

Another image processing method in accordance with the present invention includes the features of this method and may be such that:
a first reference value ($T_1$) is specified as to a degree of the variation of the luminosity data (distribution parameter DP) (Step 2 in FIG. 12); and
in image areas where the variation of the luminosity data (DP) is smaller than the first reference value ($T_1$) ($T_1$>DP, Step 3 in FIG. 12), the chromaticity data is subjected to the smoothing first (Step 4 in FIG. 12) and, if necessary, the luminosity data is subjected to the smoothing thereafter (Step 6 in FIG. 12).

With these methods, those areas located close to edges are identified using the first reference value, since the image areas where the variation of the luminosity data is larger than the first reference value are located closer to edges than to monotonous parts in the image and the areas where the variation of the luminosity data is smaller than the first reference value are located closer to monotonous parts than to edges in the image.

Therefore, a priority is given to the smoothing of the chromaticity data which is relatively impervious to edge information attenuation, rather than to the smoothing of the luminosity data which is relatively susceptible to edge information attenuation, near monotonous parts. The rate of the luminosity noise removal can be rendered smaller if chromaticity noise is removed beforehand than if not. In short, the smoothing of the luminosity data is selectively done when only it is effective. This produces better results in both the retainment of edges and the reduction of a coarse look of the image.

A further image processing method in accordance with the present invention includes the features of the foregoing method and may be such that:

a first reference value ($T_1$) is specified as to a degree of the variation of the luminosity data (DP) (Step 2 in FIG. 12); and in image areas where the variation of the luminosity data (DP) is smaller than the first reference value ($T_1$) ($T_1$>DP, Step 3 in FIG. 12), the rate of the smoothing of the chromaticity data is made greater than the rate of the smoothing of the luminosity data (Step 6 in FIG. 12).

With this method, those areas located close to edges are identified using the first reference value. Therefore, near monotonous parts, setting the rate of the smoothing of the chromaticity data which is relatively impervious to edge information attenuation smaller than the rate of the smoothing of the luminosity data which is relatively susceptible to edge information attenuation produces better results in both the retainment of edges and the reduction of a coarse look of the image.

A still further image processing method in accordance with the present invention includes the features of the foregoing method and may be such that:

a second reference value ($T_2$) is specified as to a degree of the variation of the luminosity data (DP) (Step 2 in FIG. 12) so that the second reference value ($T_2$) is smaller than the first reference value ($T_1$); and in image areas where the variation of the luminosity data (DP) is larger than the second reference value ($T_2$) DP>$T_2$, Step 5 in FIG. 12), the luminosity data is not subjected to the smoothing (Step 7 in FIG. 12).

With this method, the specification of the first and second reference values enables the image to be divided into those areas close to monotonous parts, those areas close to edges, and the middle areas relatively far from both the monotonous parts and the edges, since those areas close to the monotonous parts are further divided into two groups according to whether the variation of the luminosity data is smaller than the second reference value or not.

Removing no noise from the luminosity data which is relatively susceptible to edge information attenuation in those areas where the variation of the luminosity data is larger than the second reference value produces better results in the retainment of the edges in the image.

Meanwhile, removing noise from the chromaticity in at least those areas where the variation of the luminosity data is smaller than the first reference value as described in the foregoing produces good results in the reduction of a coarse look of the image.

A further image processing method in accordance with the present invention includes the features of the foregoing method and may be such that in image areas where the variation of the luminosity data (DP) is larger than the first reference value ($T_1$) (DP>$T_1$, Step 3 in FIG. 12), the luminosity data is not subjected to the smoothing and the chromaticity data is not subjected to the smoothing (Step 8 in FIG. 12).

With this method, the edges in the image are retained in an optimum manner, since no noise is removed from the luminosity data and the chromaticity data in those areas where the variation of the luminosity data is larger than the first reference value, that is, those areas located close to edges in the image.

Still another image processing method in accordance with the present invention includes the features of the foregoing method and may be such that the rate of the smoothing of the chromaticity data and the rate of the smoothing of the luminosity data are changed according to a distribution parameter of the luminosity data.

In this method, the distribution parameter of the luminosity data is easily computable and still faithfully represents variations of the luminosity data: the distribution parameter is 0 if the luminosity data has no variation at all and takes an increasingly large positive value when the variation of the luminosity data increases starting from 0.

Therefore, the distribution parameter computed for the luminosity data enables easy discrimination, for example, among those areas close to monotonous parts, those areas close to edges, and the middle areas relatively far from both the monotonous parts and the edges.

Using the distribution parameter of the luminosity data, the balance can be easily optimized between the chromaticity noise removal and the luminosity noise removal. The distribution parameter is obtained by raising to the second power and then averaging the difference between the mean value of the luminosity data and the mean value of the luminosity data; the noise removal using the distribution parameter imparts a very natural look to the image, presumably, because the computation involves raising to the second power. Besides, the computation is simple and quick and makes great contributions to implement the image processing method by hardware.

An image processing device in accordance with the present invention includes:

(1) a data separator section for separating image data into luminosity data and chromaticity data;

(2) a chromaticity noise removing section for smoothing the chromaticity data;

(3) a luminosity noise removing section for smoothing the luminosity data; and (4) a smoothing rate computing section for computing a variation of the luminosity data in two-dimensional coordinate space and computing, for each unit area of an image, a rate of the smoothing of the chromaticity data and a rate of the smoothing of the luminosity data according to the variation as outputs to the chromaticity noise removing section and the luminosity noise removing section respectively.

Another image processing device in accordance with the present invention includes the features of the foregoing configuration and may be such that the smoothing rate computing section compares the variation of the luminosity data with a first reference value specified as to a degree of the variation of the luminosity data, and in image areas where the variation of the luminosity data is smaller than the first reference value, computes the rates given by such equations that the rate of the smoothing of the chromaticity data becomes larger than the rate of the smoothing of the luminosity data.

With this configuration, the image processing device produces better results in both the retainment of edges and the reduction of a coarse look of the image.

A further image processing device in accordance with the present invention includes the features of the foregoing configuration and may be such that the smoothing rate computing section compares the variation of the luminosity data with a second reference value specified as to a degree of the variation of the luminosity data so that the second reference value is smaller than the first reference value, and in image areas where the variation of the luminosity data is larger than the second reference value, computes the rates given by such equations that the luminosity data is not subjected to the smoothing.

With this configuration, the image processing device produces better results in the retainment of edges and produces as good results in the reduction of a coarse look of the image.

A still further image processing device in accordance with the present invention includes the features of the foregoing configuration and may be such that in image areas where the variation of the luminosity data is larger than the first reference value, the smoothing rate computing section computes the rates given by such equations that the luminosity data is not subjected to the smoothing and the chromaticity data is not subjected to the smoothing.

With this configuration, the edges in the image are retained in an optimum manner.

Yet another image processing device in accordance with the present invention includes the features of the foregoing configuration and may be such that the smoothing rate computing section includes a reference specification section for assigning variable values to the reference values depending on an external input.

With this configuration, neither the first reference value nor the second reference value is fixed, but are varied by the reference specification section; therefore, the reference values can be selected, while checking the quality of the resultant image, so that optimum balanced is obtained between the retainment of edges and the reduction of a coarse look of the image.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing method, comprising the steps of:
   separating image data into luminosity data and chromaticity data; and
   changing a rate of smoothing of the chromaticity data and a rate of smoothing of the luminosity data according to a variation of the luminosity data in two-dimensional coordinate space,
   wherein:
   a first reference value is specified as to a degree of the variation of the luminosity data; and
   in image areas where the variation of the luminosity data is smaller than the first reference value, the chromaticity data is subjected to the smoothing first and, if necessary, the luminosity data is subjected to the smoothing thereafter.

2. An image processing method, comprising the steps of:
   separating image data into luminosity data and chromaticity data; and
   changing a rate of smoothing of the chromaticity data and a rate of smoothing of the luminosity data according to a variation of the luminosity data in two-dimensional coordinate space,
   wherein:
   a first reference value is specified as to a degree of the variation of the luminosity data; and
   in image areas where the variation of the luminosity data is smaller than the first reference value, the rate of the smoothing of the chromaticity data is made greater than the rate of the smoothing of the luminosity data.

3. The image processing method as defined in claim 1, wherein:
   a second reference value is specified as to a degree of the variation of the luminosity data so that the second reference value is smaller than the first reference value; and
   in image areas where the variation of the luminosity data is larger than the second reference value, the luminosity data is not subjected to the smoothing.

4. The image processing method as defined in claim 2, wherein:
   a second reference value is specified as to a degree of the variation of the luminosity data so that the second reference value is smaller than the first reference value; and
   in image areas where the variation of the luminosity data is larger than the second reference value, the luminosity data is not subjected to the smoothing.

5. The image processing method as defined in claim 1, wherein
   in image areas where the variation of the luminosity data is larger than the first reference value, the luminosity data is not subjected to the smoothing and the chromaticity data is not subjected to the smoothing.

6. The image processing method as defined in claim 2, wherein
   in image areas where the variation of the luminosity data is larger than the first reference value, the luminosity data is not subjected to the smoothing and the chromaticity data is not subjected to the smoothing.

7. An image processing device, comprising:
   a data separator section for separating image data into luminosity data and chromaticity data;
   a chromaticity noise removing section for smoothing the chromaticity data;
   a luminosity noise removing section for smoothing the luminosity data; and
   a smoothing rate computing section for computing a variation of the luminosity data in two-dimensional coordinate space and computing, for each unit area of an image, a rate of the smoothing of the chromaticity data and a rate of the smoothing of the luminosity data according to the variation as outputs to the chromaticity noise removing section and the luminosity noise removing section respectively,
   wherein
   the smoothing rate computing section compares the variation of the luminosity data with a first reference value specified as to a degree of the variation of the luminosity data, and in image areas where the variation of the luminosity data is smaller than the first reference value, computes the rates given by such equations that the rate of the smoothing of the chromaticity data becomes larger than the rate of the smoothing of the luminosity data.

8. The image processing device as defined in claim 7, wherein
   the smoothing rate computing section compares the variation of the luminosity data with a second reference value specified as to a degree of the variation of the luminosity data so that the second reference value is smaller than the first reference value, and in image areas where the variation of the luminosity data is larger than the second reference value, computes the rates given by such equations that the luminosity data is not subjected to the smoothing.

9. The image processing device as defined in claim 7, wherein
   in image areas where the variation of the luminosity data is larger than the first reference value, the smoothing rate computing section computes the rates given by such equations that the luminosity data is not subjected to the smoothing and the chromaticity data is not subjected to the smoothing.

10. The image processing device as defined in claim 7, wherein
    the smoothing rate computing section includes a reference specification section for assigning variable values to the reference values depending on an external input.

* * * * *